April 28, 1964 S. W. GATES ETAL 3,131,297

ELECTRONIC CIRCUIT FOR CONVERTING POLAR TO RECTANGULAR CO-ORDINATES

Original Filed Feb. 25, 1958 4 Sheets-Sheet 1

INVENTOR.
Sheldon W. Gates
BY John M. Sanborne
Mueller & Aichele
Attys.

INVENTOR.
Sheldon W. Gates
BY John M. Sanborne
Mueller & Aichele
Attys.

April 28, 1964 S. W. GATES ETAL 3,131,297

ELECTRONIC CIRCUIT FOR CONVERTING POLAR TO RECTANGULAR CO-ORDINATES

Original Filed Feb. 25, 1958 4 Sheets-Sheet 3

INVENTOR.
Sheldon W. Gates
John M. Sanborne
BY
Mueller & Aichele
Attys

INVENTOR.
Sheldon W. Gates
John M. Sanborne
BY
Mueller & Aichele
Attys.

3,131,297

ELECTRONIC CIRCUIT FOR CONVERTING POLAR TO RECTANGULAR CO-ORDINATES

Sheldon W. Gates and John M. Sanborne, Phoenix, Ariz., assignors to Motorola, Inc., Chicago, Ill., a corporation of Illinois Continuation of application Ser. No. 717,499, Feb. 25, 1958. This application Jan. 12, 1962, Ser. No. 168,001
8 Claims. (Cl. 235—189)

This invention relates to electronic apparatus to perform the analogue operation of converting polar coordinate information to rectangular coordinate information. This is a continuation of our application Serial No. 717,499, filed February 25, 1958, now abandoned.

In present day electronic computers and radar equipment it is frequently necessary to convert polar coordinate signal information into signals usable in a rectangular coordinate system. This conversion involves the computation of $x$ and $y$ in the equations $x=A$ cosine $\theta$; $y=A$ sine $\theta$, where A and $\theta$ are given.

The system of this invention is concerned with the utilization of two time spaced pulses representing A, or vector magnitude, and two time spaced pulses representing $\theta$ or vector angle, and the conversion of these two sets of pulses into two signals representing ordinate and abscissa quantities for representation of the vector in Cartesian coordinates, that is in which one end of the vector is located at an axis intersection and the other end of the vector is represented by the ordinate and abscissa quantities. The two sets of polar coordinate pulses for conversion in the system of the invention can be produced in various ways, the choice of which can be primarily determined by the overall system in which the conversion system is used. In order to illustrate one way in which the invention has been successfully used, it will be described in a radar system in which information in polar coordinates is converted to rectangular coordinates for display on a cathode ray tube.

In such a radar application the time spacing of transmitted pulses and echos can represent the range information, or magnitude of A directly, and antenna angle can supply the target angle or azimuth with respect to a reference antenna position, which represents $\theta$. Conversion of this polar coordinate information into rectangular coordinate signals may then be desirable for application to the electrostatic deflection system of a cathode ray tube.

Prior systems for providing rectangular coordinate signals have required mechanical or servo means to establish both range and angle information in a rectangular coordinate system, as well as various associated circuits along with the mechanical or servo means, all of which tend to introduce errors into the conversion operation. Aside from such inaccuracies which may be developed in the mechanical conversion of range and angle information, such apparatus may also be of considerable size and weight rendering it less suitable for some applications such as in aircraft.

An object of the present invention is to provide an electronic conversion system wherein radar range information may be used directly, thus preserving accuracy, and only relatively accurate mechanical operation is required to obtain the necessary angular information.

Another object is to provide an electronic system for converting time modulated polar coordinate information into rectangular coordinate information with a high degree of accuracy.

Another object is to provide a system for converting polar coordinate information into rectangular coordinate signals which can be displayed by a cathode ray tube, and which system can be constructed in a form which is compact and of light weight.

A feature of the invention is the provision of an electronic coordinate conversion system utilizing time spaced pulses to establish the amplitude of a ringing signal representing vector magnitude, which ringing signal is divided into signals displaced by 90° and sampled according to angle information in the form of time spaced pulses.

Another feature of the invention is the provision of such a coordinate conversion system wherein angle information in the form of time spaced pulses, for example, produced by a linear potentiometer operated by a radar antenna with the potentiometer controlling a pulse time modulator, operating through bidirectional diode bridge gates controls sampling of two ringing signals phase displaced by 90° to establish vector angle.

Another feature is the provision of such a coordinate conversion system utilizing linear bidirectional bridge gates, triggered by means of precise control circuits, for controlling a ringing circuit to establish the amplitude of a ringing signal representing vector magnitude and for controlling the sampling instant of the ringing signal to insure accuracy of coordinate conversion.

Further objects, features and the attending advantages of the invention will be apparent upon consideration of the following description when taken in conjunction with the accompanying drawings in which.

In the coordinate conversion system of the invention, time spaced pulses representing vector magnitude and time spaced pulses representing vector angle, are converted to rectangular (Cartesian) coordinate information which may be used to control the electrostatic deflection system of a cathode ray tube for visual display of the information. The vector magnitude information can be direct range information from radar interrogation and echo pulses, while the vector angle information can be derived by a potentiometer system operated by the radar antenna, which potentiometer system controls a pulse-time modulator. In the conversion of the time modulated pulses, the capacitor of a tuned circuit, or ringing circuit, is charged through a bidirectional diode bridge gate to a potential representing vector magnitude and the ringing circuit is allowed to ring through a bidirectional diode bridge gate for a fixed period at the established amplitude. A phase shifting network is utilized to form two signals phase displaced by 90° and having amplitude representing the vector magnitude. These two signals are sampled through bidirectional diode bridge gates at an instant corresponding to vector angle and the sampled value represents Cartesian coordinate information which may be used for electrostatic deflection in a cathode ray tube for display purposes.

Figure 1:
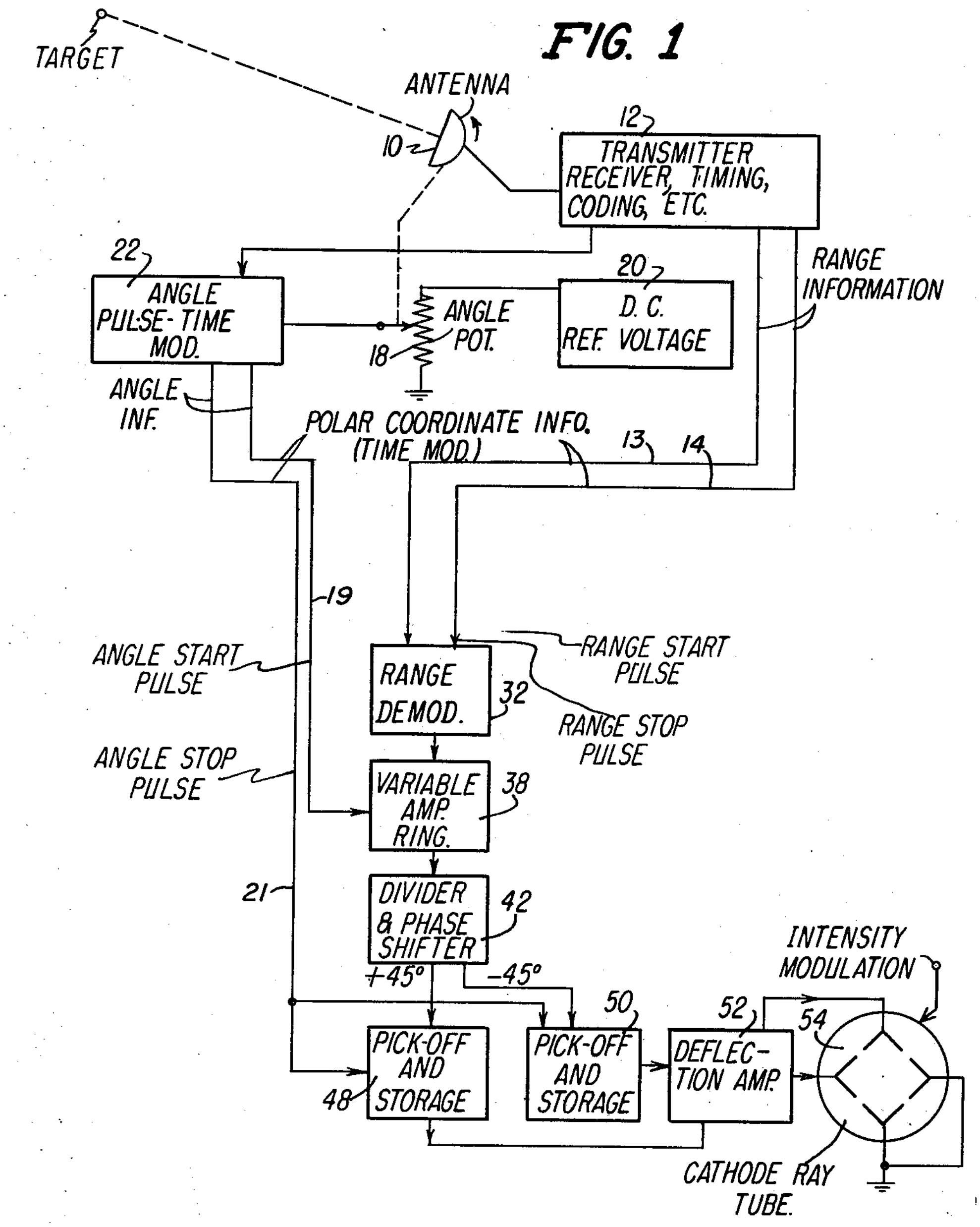
FIG. 1 is a block diagram showing the coordinate conversion system as it may be utilized in a radar system.

The system of the present invention will be described as it is used in a particular application, although other applications will be apparent to those familiar with the art. The following brief description of the radar system in block form in FIG. 1 is to show one way of utilizing the polar-to-rectangular coordinate conversion system of the invention and will serve to illustrate how pairs of pulses representing polar coordinate information can be generated for use in the conversion system which is shown in detail in FIGS. 3 and 4. In FIG. 1 the leads marked angle start pulse and angle stop pulse are intended to indicate the leads on which a pair of pulses are applied, the spacing between which represents the angular position of a vector; and the leads marked range start pulse and range stop pulse are intended to indicate the leads to which are applied a pair of pulses the spacing between which represents vector magnitude.

Figure 2:
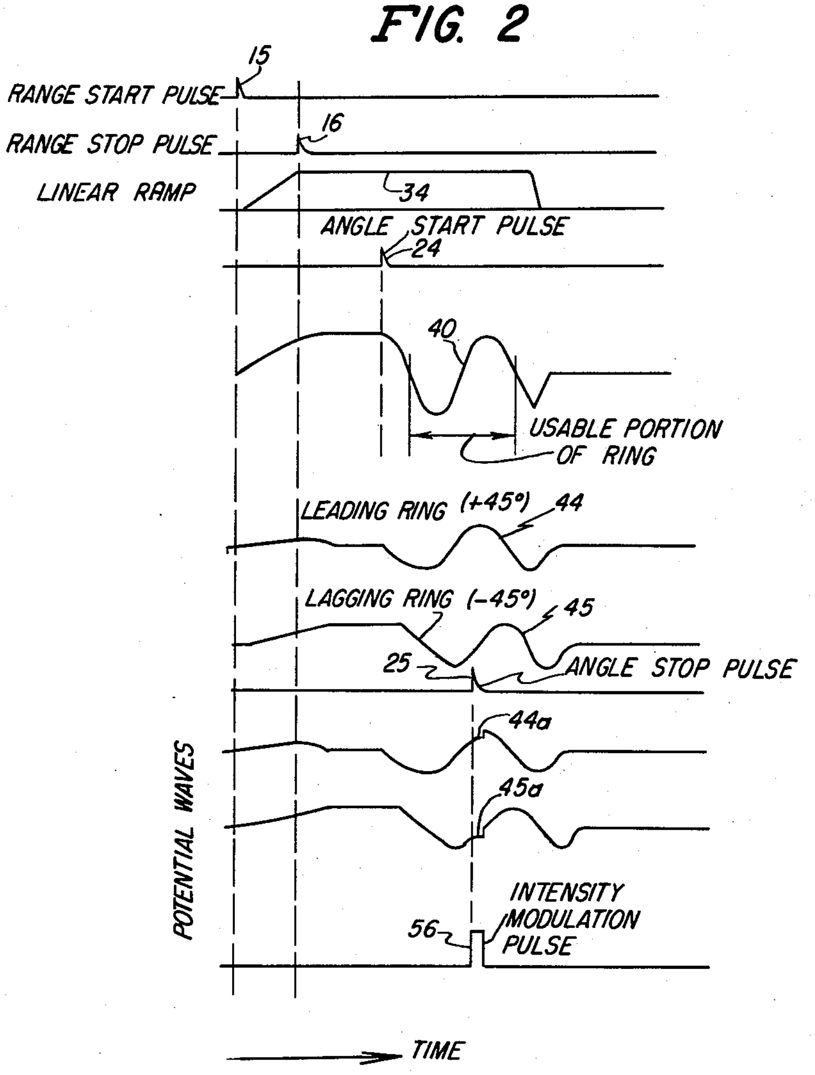
FIG. 2 is a set of graphs useful in explaining the operation of the conversion system.

In FIG. 1 there is shown a radar system including a motor driven rotatable antenna 10 which is designed to turn through 360°. This is connected to suitable transmitter-receiver apparatus 12 which is arranged to transmit pulses and receive echos from a target to provide range information in the form of time modulated pulses such as range start pulse 15 and range stop pulse 16 as shown in FIG. 2.

Antenna 10 rotates in synchronism with angle potentiometer 18 across which a reference voltage is applied from the direct current voltage source 20. A pulse time modulator circuit 22 is connected to the arm of the potentiometer 18 and to the transmitter-receiver apparatus 12 and this modulator circuit is arranged to provide time spaced pulses representing the angular position of the antenna. These are shown in FIG. 2 as angle start pulse 24 and angle stop pulse 25. It may be noted that the transmitter-receiver apparatus 12 would include suitable timing circuits so that in any given position of the antenna 10 the necessary range pulses and azimuth pulses may be obtained in the sequence shown in FIG. 2.

*General Operation of Polar to Rectangular Coordinate Conversion System*

The range start pulse 15 and the range stop pulse 16 (FIG. 2), the time spacing between which represents vector magnitude and in the case of radar represents target distance, are applied via leads 13 and 14 to the range demodulator 32 which develops a linear ramp that is maintained at a D.C. value 34 which is directly related to the time separation between the range pulses. This D.C. value 34 is maintained until the other circuits have performed their function.

The D.C. value 34 is used to establish the operating level, or magnitude of oscillations, in a variable amplitude ringing circuit 38. As will be described in greater detail subsequently, the direct current potential representing vector magnitude, or range, charges a capacitor in the ringing circuit, the energy from which is used in an oscillating tuned circuit. The angle start pulse (it being understood that this is one of a pair of pulses representing vector angle) is also applied to the ringing circuit 38 on lead 19, and as shown in FIG. 2, this start pulse 24 occurs after the range stop pulse 16 to trigger the ringing circuit and provide a sine wave 40 having an amplitude related to the D.C. value 34, that is, the vector magnitude.

Ringing circuit 38 is connected to a divider and phase shift circuit 42 which provides a leading sine wave 44 and a lagging sine wave 45 which are respectively leading sine wave 40 by 45° and lagging sine wave 40 by 45°. It may be noted that the signals 44, 45 are displaced in phase by 90° and that these signals would trace a circle if applied to the deflection plate of a cathode ray tube, and that this circuit would have a radius representing target range or vector magnitude.

The leading ring or wave 44 is applied to a pick-off and storage circuit 48 and the lagging ring or wave 45 is applied to a pick-off and storage circuit 50. Circuits 48 and 50 received angle stop pulse 25 on lead 21 (this pulse being the other pulse in the representation of vector angle) and these circuits include suitable storage capacitors which will maintain potentials corresponding to the instantaneous amplitudes of the waves 44 and 45 when stop pulse 25 occurs. The instantaneous amplitude of wave 44 is designated 44*a* in FIG. 2 and that of signal 45 is designated 45*a*. The potential levels 44*a* and 45*a* are coupled to deflection amplifiers 52 which are connected to the electrostatic deflection plates of cathode ray tube 54. Suitable intensity modulation may be applied to the cathode ray tube when signals represented by potentials 44*a* and 45*a* are applied to the deflection plates in order to brighten the screen at this time and produce a spot which will represent the original polar coordinate information as it has been converted into signals representing rectangular or Cartesian coordinates. The intensity modulation pulse 56 is shown in FIG. 2.

*Vector Magnitude Demodulator of the Conversion System*

Figure 3:
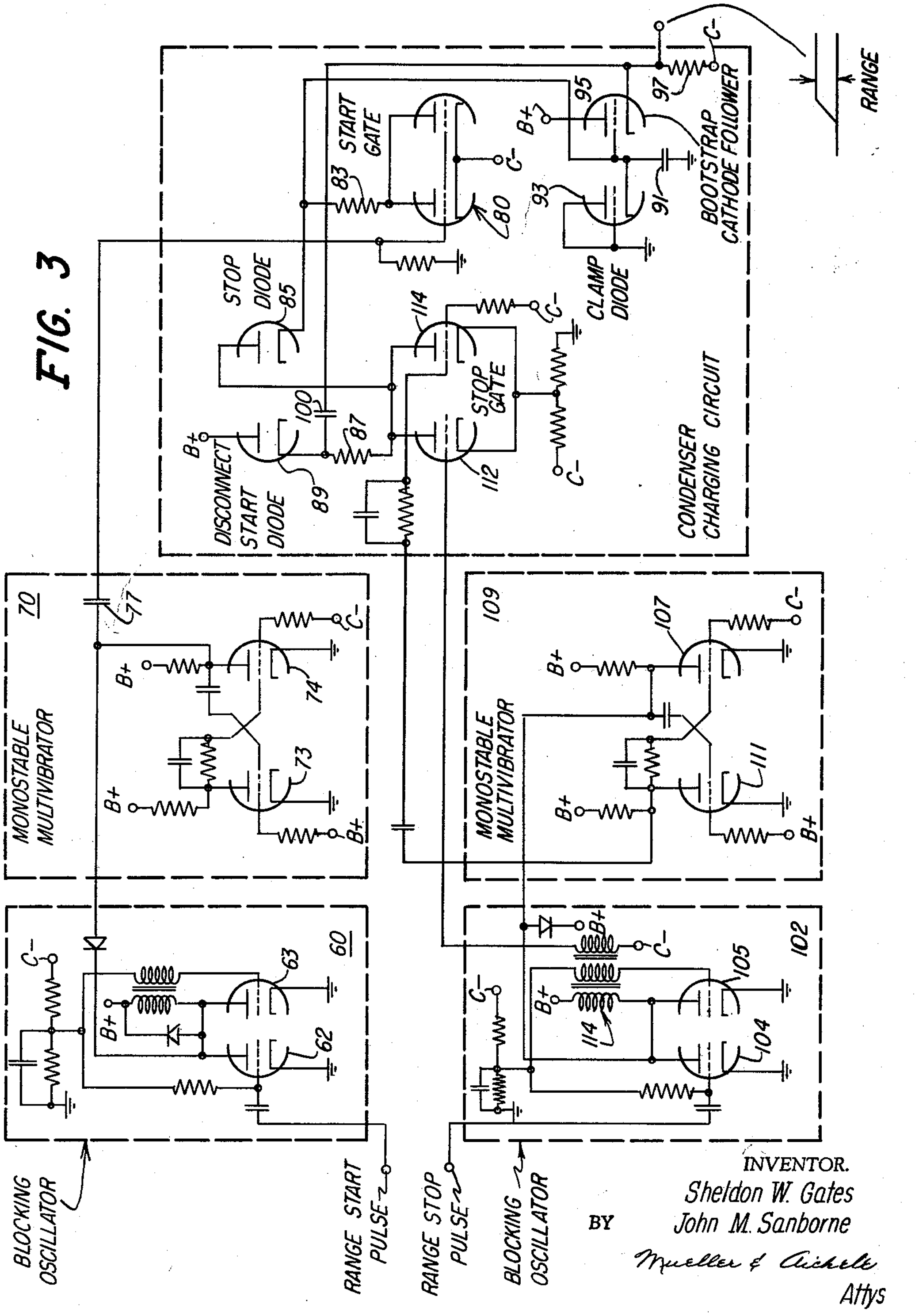
FIGS. 3 and 4 are schematic diagrams of the conversion system of the invention.

The specific form of the range demodulator circuit 32 is shown in FIG. 3. The D.C. voltage 34 (FIG. 2) is provided by a "bootstrap" condenser charging circuit which is operated by the range start and stop pulses. These time separated trigger pulses are converted into square wave control gates for the bootstrap circuit by means of blocking oscillators which provide a desirably short rise time for fast response to the trigger pulses and multi-vibrator circuits to provide square wave control gates for the bootstrap charging circuit. The width of these control gates is such as to insure proper circuit function consistent with time division with other stations in an entire system and consistent with a predetermined maximum range for the apparatus.

Range start pulse 15 is applied to the blocking oscillator 60 which includes a pair of triodes 62 and 63. The triodes 62, 63 are normally cut off but are driven into conduction when the pulse 15 is applied to the grid of tube 62. Feedback is utilized in the oscillator 60 to insure a positive response to the start pulse. The output of the oscillator 60 is applied to monostable multivibrator 70 which includes triodes 73 and 74. Triode 73 is normally conducting and triode 74 is normally cut off. However, when the signal from oscillator 60 is applied to the anode of triode 74, the conditions are reversed and triode 73 is cutoff, with triode 74 then conductive. The output of the multivibrator 70 is derived from the anode of triode 74 and is coupled through blocking capacitor 77 and applied to the control grid of the starting gate triode 80. Triode 80 is normally conductive with its conduction path extending between C-minus at its cathode, through resistor 83 and diode 93 to ground. However, when the negative going pulse is applied to gating triode 80 this tube becomes cut off. Prior to cut off of triode 80, the voltage on bootstrap capacitor 91 was maintained at approximately zero by means of clamp diode 93 connected thereacross. However, as starting gate triode 80 is cut off, capacitor 91 commences to charge through diode 85, resistor 87 and diode 89. Diode 89 immediately is cut off by the rising voltage at the cathode of cathode follower 95 and the charging power for capacitor 91 is obtained from the cathode follower triode 95. Due to bias circuits of triodes 112, 114, these triodes are cut off at this time.

The anode of triode 95 is connected to B-plus and its cathode is connected through resistor 97 to C-minus. The grid of this tube is connected to the junction of bootstrap capacitor 91 and the cathode of diode 85. The cathode of triode 95 is also connected through capacitor 100 to the junction of resistor 87 and the cathode of diode 89. Accordingly, as capacitor 91 commences to charge, the voltage at the cathode of triode 95 rises and the voltage at the top of resistor 87 is raised in accordance with the instantaneous potential on capacitor 91. This action maintains a constant voltage across resistor 87 and thus capacitor 91 charges linearly.

During the linear charge of capacitor 91 the range stop pulse 16 is applied to the blocking oscillator 102. Pulse 16 thereby drives normally cut off triodes 104 and 105 into conduction. The output derived from the anodes of these two tubes in the blocking oscillator circuit is supplied to the anode of triode 107 in the monostable multivibrator 109. Triode 111 in the circuit 109 is normally conductive and triode 107 is normally cut off. However, as the signal is applied from blocking oscillator 102, the conduction condition reverses and triode 111 is cut off with triode 107 conductive.

During the charging of capacitor 91 triodes 112 and 114 are in a cut off condition. A triggering pulse for tube 112 is derived from the feedback transformer 114 in the blocking oscillator 102, and this is a positive going pulse to drive tube 112 into conduction thus lowering its anode potential and lowering the potential of the anode of diode 85 which is connected thereto. Accordingly, diode 85 is cut off which thus interrupts the charging of capacitor 91, and this capacitor maintains its charge.

A positive going pulse is also derived from the anode of triode 111 in the multivibrator 109. This is applied to the grid of triode 114 causing this tube to conduct and further the action of triode 112.

At the cathode of cathode follower triode 95, there appears a direct current potential which is proportional to the time separation of the range start and stop pulses and this potential represents the vector magnitude or radar range. Utilization of this potential will be explained in connection with the diagram of FIG. 4. As shown in FIG. 1, the potential is applied to the variable amplitude ringing circuit 38 and is maintained until after the occurrence of angle start pulse 24. Then, consistent with time sharing in the system, collapse of the signals from multivibrators 70, 109 causes return to the previously described "normal" condition of the circuits.

*Vector Angle Demodulator of the Conversion System*

Figure 4:
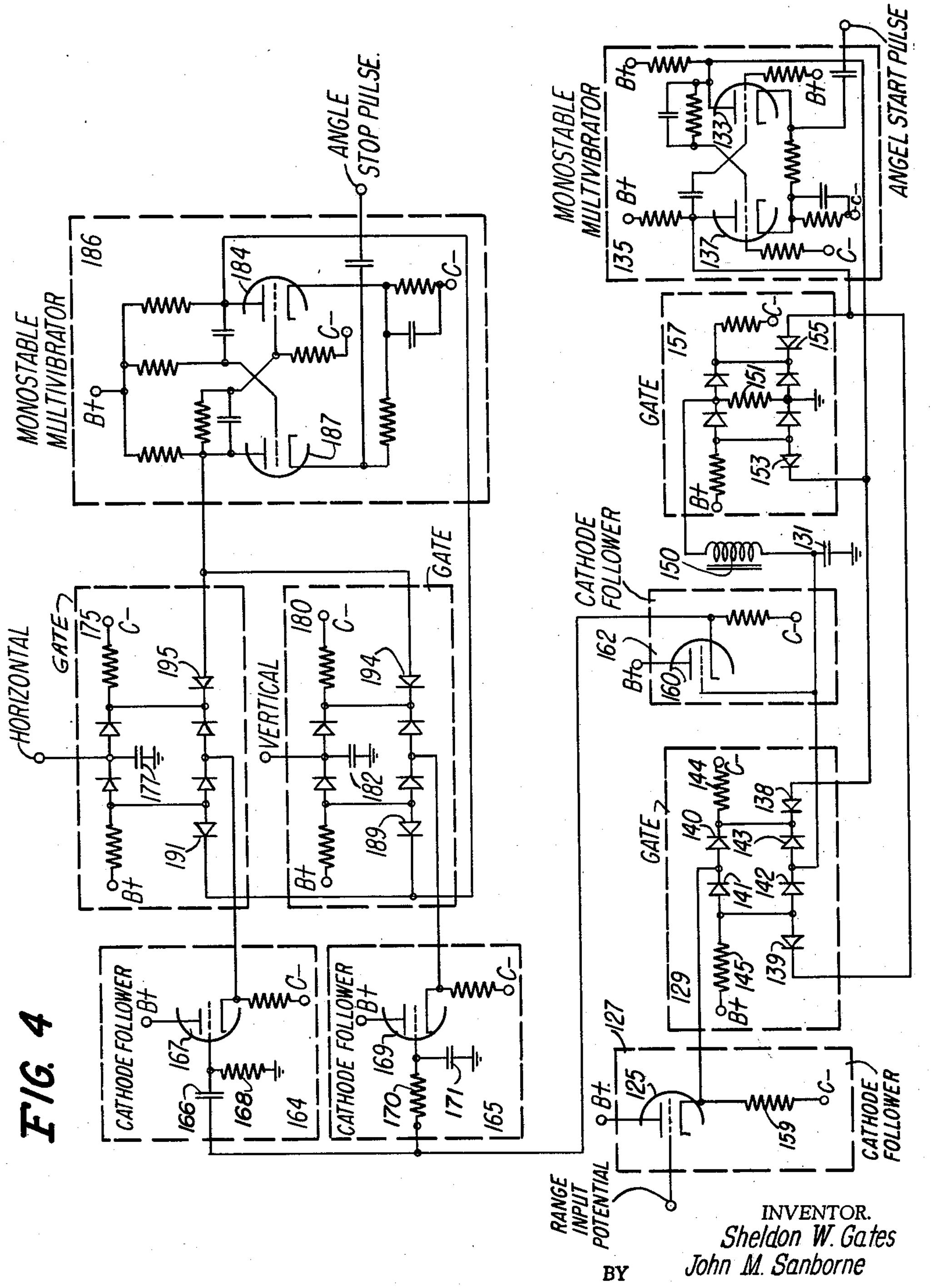

In FIG. 4, the direct current potential representing vector magnitude is applied to the grid of triode 125 in the cathode follower circuit 127. The potential thus established at the cathode of triode 125 is applied through the bi-directional linear diode gate 129 to the capacitor 131. The capacitor is charged in direct proportion to the direct current output voltage of the range demodulator 32.

The angle start pulse 24 is applied to the cathode of triode 133 in the monostable multivibrator 135. In the normal condition triode 137 is cut off and triode 133 is conductive. However, as the angle start pulse is applied to the multivibrator 135, this conduction condition reverses and triode 137 is conducting while triode 133 is cut off.

The anode of triode 133 is connected to diode 138 in the gate circuit 129 and the anode of triode 137 is connected to the diode 139 in this gate circuit. The gate 129 is a six diode bridge gate which is a rapid action switch and causes the capacitor 131 to be disconnected from the cathode of triode 125 in response to angle start pulse 24.

In the conducting condition of gate 129, diodes 138 and 139 are biased to cut-off and diodes 140, 141, 142 and 143, connected in a bridge circuit, are conductive between C-minus and B-plus through resistors 144 and 145. An input signal applied to the interconnection of diodes 140, 141 is transferred as a corresponding signal in an output circuit connected to the junction of diodes 142 and 143. In this way capacitor 131 is charged through the diode bridge gate 129. When the angle start pulse 24 occurs, a positive going pulse is applied to diode 138 and a negative going pulse is applied to diode 139, causing these diodes to be conductive through resistors 144 and 145, respectively, thereby cutting off diodes 140 and 143 as well as diodes 141 and 142. Additional diode bridge gates 157, 175 and 180 described subsequently, also operate in a corresponding manner in response to the trigger pulses applied thereto.

A capacitor 131 is charging, inductor 150 and resistor 151 are series connected thereacross. Resistor 151 is made large enough to effectively isolate the inductor from the charging circuit.

The angle start pulse 24 also causes immediate closing of the normally open gate 157, thereby connecting capacitor 131 and inductor 150 directly in parallel in the ringing circuit. Gate 157 is triggered into a conduction condition by means of the pulses applied to diodes 153 and 155 from tubes 133 and 137, respectively. As previously pointed out, the amplitude of the ringing signal is directly proportional to vector magnitude. Resistor 151 provides a dissipation path for inductor 150 when the ringing signal has been used and gate 157 is again open.

It may be seen therefore, that capacitor 131 charges from a low impedance source, that is, cathode follower 127 through the normally closed gate 129, so that the capacitor is effectively connected between ground and the cathode of tube 125, which is connected through resistor 159 to C-minus. At this time, gate 157 is open. However, when the ringing operation commences, gate 129 is opened simultaneously with the closing of gate 157 which directly couples one side of inductor 150 to ground. This is a desirable relationship of the gate 157 and the ringing circuit since a gate circuit of this type possesses an impedance to ground when in a conducting condition, and in the system described, both sides of gate 157 are at ground potential during the ringing operation.

It is further pointed out that as capacitor 131 and inductor 150 are ringing, the instantaneous potential at the junction thereof may be negative with respect to ground. For this reason multivibrator 135 provides a pulse to cut off diode 139 which is negative with respect to ground. This is obtained by returning the cathode of triode 133 to the C-minus source. To further improve the operation of the system and the speed of response thereof thus preventing undesirable duty-cycle errors, multivibrator 135 is direct current coupled to the diode gates 129 and 157. The energization circuits of triodes 133 and 137 therefore include connections of the cathodes thereof to the C-minus potential and connections of the anodes thereof to the B-plus potential.

In the utilization circuit for the ringing signal, the junction of capacitor 131 and inductor 150 is connected to the grid of triode 160 in the cathode follower circuit 162. The output of circuit 162 is connected to the input of cathode follower 164 and the input of cathode follower 165. The input circuit for cathode follower 164 includes a series connected capacitor 166 and resistor 168 with the input signals applied to triode 167 from across the resistor of this input network. Accordingly, the output from circuit 164 leads the input signal by 45°. The input network to cathode follower 165 includes a series connected resistor 170 and capacitor 171 with the input to triode 169 being derived from across the capacitor, so that the output of cathode follower 165 lags the input signal by 45°. The signal from cathode follower 165 is designated 44 in FIG. 2 and that from cathode follower 64 is designated 45 in that figure.

The signal from cathode follower 164 is applied through the normally conducting diode bridge gate 175 and across storage capacitor 177. Similarly, the output of cathode follower 165 is applied through the normally conducting diode bridge gate 180 and across the storage capacitor 182.

When the angle stop pulse 25 occurs, it is applied to the cathode of triode 187 in the monostable multivibrator 186. Normally, triode 184 is cut off and triode 187 is conducting. However, the angle stop pulse causes triode 187 to be cut off and triode 184 to conduct. The anode of triode 184 is connected to diode 189 in gate 180 and diode 191 in gate 175. A negative going pulse is applied to diodes 189, 191. The anode of triode 187 is connected to diode 194 in gate 180 and to diode 195 in gate 175. A positive going pulse is applied to these diodes, and both positive and negative going pulses from the multivibrator 186 cause gates 175 and 180 to be nonconductive. This leaves capacitors 177 and 182 with respective instantaneous potentials 45*a* and 44*a* as shown in FIG. 2. These potentials are then derived from the terminals shown and applied to suitable deflection amplifiers 52 as shown in FIG. 1. When the pulses from multivibrators 135, 186 collapse, the circuits return to the described "normal" state and the entire conversion system may be reoperated.

Therefore, in response to the angle start pulse 24 and the angle stop pulse 25, the ringing signals 44 and 45 are produced in the proper phase and started at the proper time so that their respective instantaneous values at the time of the angle stop pulse 25 will represent the vector angle or radar target azimuth. The use of the bi-directional linear gates 129 and 157 provide control of the ringing circuit 131, 150 with a high degree of accuracy, while at the same time affording a desirable damping of the circuit during charging of the condenser. However, when the circuit is ringing or oscillating these gates by their arrangement in the circuit, offer an extremely high damping resistance thereby insuring accuracy of the amplitude of the ringing signal. The use of gates 175 and 180 also provide highly accurate and efficient control of the storage capacitors 177 and 182 which furnish the output potentials of the coordinate convergence system.

Accordingly, this invention may be used to perform the conversion from polar coordinate information, in the form of time modulated pulses, to Cartesian coordinate information in the form of a pair of control potentials. The system is particularly adapted for use in conjunction with radar apparatus where it may be employed in a system as shown and described in a manner to minimize the need for relying upon mechanical apparatus in forming the range and angle information into suitable signals for use with display apparatus. Therefore, the system permits the construction of compact, lightweight radar equipment.

We claim:

1. An electronic circuit for converting signal information representing a vector quantity in polar coordinates into a pair of potentials representing such quantity in rectangular coordinates, said circuit including in combination, circuit means for producing a direct current potential proportional to vector magnitude, a ringing circuit for producing a first sine wave having an amplitude proportional to the direct current potential, circuit means for producing second and third sine waves in 90° phase relation and having amplitudes proportional to that of the first sine wave, circuit means for sampling the instantaneous values of the potentials of the second and third sine waves at a time of the respective periods thereof corresponding to vector angle, whereby such potentials represent the vector quantity in rectangular coordinates.

2. An electronic circuit for converting first time spaced pulses representing vector magnitude and second time spaced pulses representing vector angle into signals representing rectangular cordinate information, said circuit including in combination, circuit means for producing a direct current potential proportional to the time spacing of the first pulses, a ringing circuit controlled by the direct current potential to produce a first sine wave having an amplitude proportional to vector magnitude, circuit means for producing second and third sine waves in 90° phase relation and having amplitudes proportional to that of the first sine wave, circuit means for sampling the instantaneous values of the second and third sine waves according to the time modulation of the second pulses, and display means for utilizing the aforesaid instantaneous values of the second and third sine waves as rectangular coordinate information.

3. An electronic circuit for converting first time spaced pulses representing vector magnitude and second time spaced pulses representing vector angle into potentials representing rectangular coordinate information, said circuit including in combination, demodulator circuit means for producing a direct current potential proportional to the time difference between the first and second pulses, a tuned circuit including capacitor and inductor means, first gating circuit means coupling said capacitor means to said demodulator circuit means for charging said capacitor means according to the value of the direct current potential, said first gating circuit means being responsive to the third pulse to couple said tuned circuit in oscillatory relation for developing a sine wave having an amplitude proportional to vector magnitude, phase shift circuit means for producing first and second ringing signals in 90° phase relation and having amplitudes proportional to the amplitude of the sine wave, second gating circuit means, and first and second storage capacitor means adapted to be coupled to said phase shift circuit means through said second gating circuit means, said second gating circuit means being responsive to the fourth pulse for charging said first and second storage capacitor means to respective potentials representing the instantaneous values of the first and second ringing signals, which potentials represent rectangular coordinate information.

4. An electronic system for displaying polar coordinate information in a cathode ray tube, including in combination, circuit means providing first and second pulses time spaced to represent vector magnitude, a potentiometer system, mechanical means operating said potentiometer system according to vector angle, an angle pulse time modulator coupled to said circuit means and said potentiometer system to produce third and fourth pulses time spaced to represent vector angle and following said first and second pulses, demodulating circuit means for producing a direct current potential proportional to the time difference between the first and second pulses, a tuned circuit including capacitor and inductor means, first gating circuit means coupling said capacitor means to said demodulator circuit means for charging said capacitor means according to the value of the direct current potential, said first gating circuit means being responsive to the third pulse to couple said tuned circuit in oscillatory relation for developing a sine wave having an amplitude proportional to vector magnitude, phase shift circuit means for producing first and second ringing signals in 90° phase relation and having respective amplitudes proportional to the amplitude of the sine wave, second gating circuit means, first and second storage capacitor means adapted to be coupled to said phase shifting circuit means through said second gating circuit means, said second gating circuit means being responsive to the fourth pulse for charging said first and second storage capacitor means to respective potentials representing the instantaneous values of said first and second ringing signals, and cathode ray display apparatus having beam deflection means coupled to said storage capacitor means for control of an electron beam thereby and display of the coordinate information.

5. An electronic system for converting polar coordinate information in the form of first and second time spaced pulses representing vector magnitude and third and fourth time spaced pulses representing vector angle, into rectangular coordinate information, said system including in combination linear capacitor charging circuit means including a first capacitor and circuit means responsive to the first pulse for charging said first capacitor toward a potential increasing directly with the instantaneous charge thereon, said capacitor charging circuit means including a circuit responsive to the second pulse for interrupting the charging of said first capacitor and maintaining the charge thereon, a ringing circuit including series coupled inductor means and resistor means and second capacitor means, a first diode bridge gate coupled between said capacitor charging circuit means and said second capacitor means for applying a potential across said second capacitor means which is proportional to the potential on said first capacitor, said first diode bridge gate being subject to open circuit in response to the third pulse for interrupting the charging of said second capacitor means, a second diode bridge gate connected across said resistor means, said second diode bridge gate being subject to shunt said resistor means and couple said inductor means and said second capacitor means in oscillatory relation so that the same produces a first sine wave signal having an amplitude proportional to the time spacing of the first and second pulses, a first phase shift circuit to produce a second sine wave signal leading said first sine wave signal by 45°, a second phase shift circuit to produce a third sine wave signal lagging said first sine wave signal by 45°, third and fourth diode bridge gates, first and second storage capacitor means, said third diode bridge gate being coupled between said first phase shift circuit and said first storage capacitor means, said fourth diode bridge gate being coupled between said second phase shift circuit and said second storage capacitor means, said third and fourth diode bridge gates being subject to open circuit in response to the fourth pulse, whereby said first and second storage capacitor means are charged to respective potentials representing rectangular coordinate information, and means for utilizing said respective potentials as a representation of the coordinate information.

6. An electronic system for converting polar coordinate information, in the form of first and second time spaced pulses representing vector magnitude and third and fourth time spaced pulses representing vector angle, into rectangular coordinate information, said system including in combination linear capacitor charging circuit means to provide a potential proportional to the time spacing of the first and second pulses, a ringing circuit including series coupled inductor means, resistor means and second capacitor means, a first gating circuit coupling said capacitor charging circuit means to said ringing circuit for applying a potential across said second capacitor means which is proportional to the vector magnitude, said first gating circuit being subject to open circuit in response to the third pulse for interrupting the charging of said second capacitor means, a second gating circuit connected across said resistor means, said second gating circuit being subject to shunt said resistor means and couple said inductor means and said second capacitor means in oscillatory relation to produce a first sine wave signal having an amplitude proportional to vector magnitude, a first phase shift circuit to produce a second sine wave signal leading said first sine wave signal by 45°, a second phase shift circuit to produce a third sine wave signal lagging said first sine wave signal by 45°, third and fourth gating circuits, first and second storage capacitor means, said third gating circuit being coupled between said first phase shift circuit and said first storage capacitor means, said fourth gating circuit being coupled between said second phase shift circuit and said second storage capacitor means, said third and fourth gating circuits being subject to open circuit in response to the fourth pulse, whereby said first and second storage capacitor means are charged to respective potentials representing rectangular coordinate information, and means for utilizing said respective potentials as a representation of the coordinate information.

7. In an electronic system for controlling sine wave signals, the combination of an input circuit providing a direct current potential of certain value, capacitor means, a first diode bridge gate coupling said capacitor means to said input circuit, inductor means, a second diode bridge gate coupling said inductor means across said capacitor means, a control circuit coupled to said first and second diode bridge gates, said control circuit providing a potential for initially closing said first gate and opening said second gate for charging said capacitor means to the direct current potential, said control circuit further providing pulses for simultaneously opening said first gate and closing said second gate for coupling said capacitor means and inductor means in oscillatory relation for producing a sine wave signal having an amplitude of the certain value, and circuit means coupled to said capacitor means and inductor means for utilizing the sine wave signal.

8. The electronic system of claim 7 in which said input circuit includes a cathode follower direct current coupled to said first diode bridge gate, and said control circuit includes a monostable multivibrator direct current coupled to said first and second diode bridge gates.

No references cited.